L. KAPPERTZ.
VEHICLE WHEEL.
APPLICATION FILED MAR. 12, 1915.
1,174,584.
Patented Mar. 7, 1916.
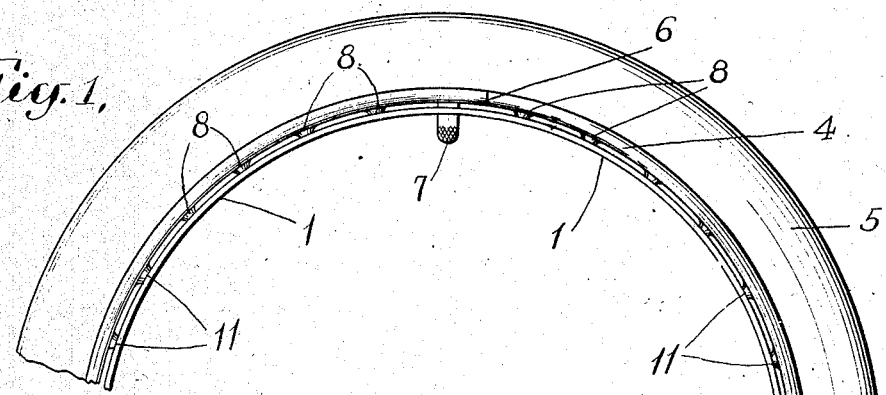
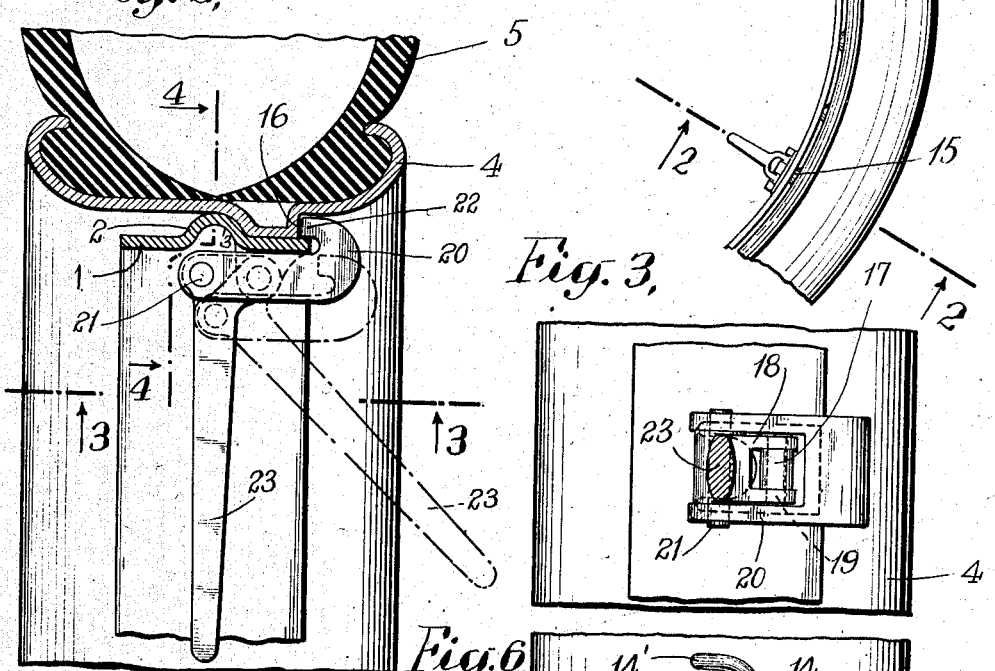
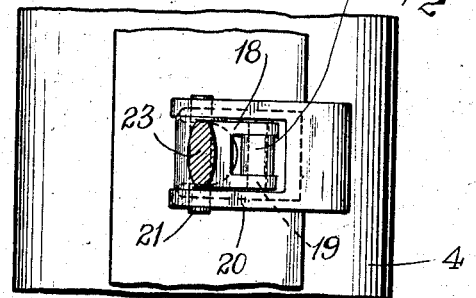
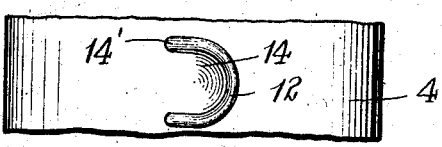
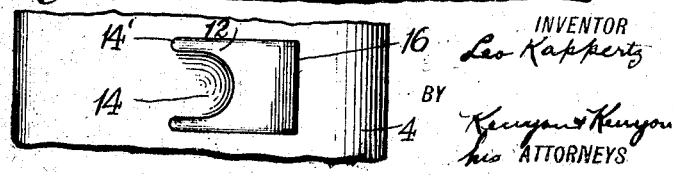
WITNESSES
INVENTOR
Leo Kappertz
BY
Kenyon & Kenyon
his ATTORNEYS

UNITED STATES PATENT OFFICE.

LEO KAPPERTZ, OF MORRISTOWN, NEW JERSEY.

VEHICLE-WHEEL.

1,174,584.  Specification of Letters Patent.  Patented Mar. 7, 1916.

Application filed March 12, 1915. Serial No. 13,859.

*To all whom it may concern:*

Be it known that I, LEO KAPPERTZ, a citizen of the United States, and a resident of Morristown, county of Morris, State of New Jersey, have invented certain new and useful Improvements in Vehicle-Wheels, of which the following is a specification.

My invention relates to vehicle wheels, and particularly to rims therefor which may be readily removed, and means for securing such rims to the felly band of a wheel.

One object of my invention is to provide a demountable rim for a wheel which may be readily attached and removed from the felly band thereof.

Another object is to provide means for holding the demountable rim against movement relative to the felly band upon which it is mounted.

Another object is to provide a means for securing a rim to a wheel which will positively lock the rim against movement relatively to the felly band throughout at least a part of the circumferential extent of the band and rim, together with means which will lock the rim and band in the remainder of the circumferential extent thereof against relative motion in all directions but one, and to provide means for locking the rim and band against relative motion in that one direction in that part of the rim and band.

Another object is to provide means for forcing the rim onto the band and for locking the rim in position on the band.

Other and further objects and advantages of my invention will appear from the following description taken in connection with the accompanying drawings forming a part of this specification, and which will be pointed out with more particularity in the claims.

To attain the objects of my invention, I provide the felly band of a wheel with hemispherical projections, and provide the inside of the rim with complete hemispherical recesses throughout a part of its circumferential extent and with hemispherical recesses open at one side throughout the remainder of its circumferential extent, and provide a device, including a toggle, for forcing the projections into the open sides of the recesses and holding them in that position.

In the accompanying drawings, in which like reference characters indicate similar parts, Figure 1 is a partial side view of a felly band having a demountable rim carrying a tire and attached thereto by means constructed in accordance with my invention; Fig. 2 is a sectional view on the line 2—2 of Fig. 1; Fig. 3 is a sectional view on the line 3—3 of Fig. 2; Fig. 4 is a sectional view on the line 4—4 of Fig 2; Fig. 5 is a plan view of the lug shown in section in Fig. 2; Fig. 6 is a plan view of an open-sided recess; and Fig. 7 is a plan view of a complete hemispherical recess.

In the specific structure which I have devised as embodying my invention, the felly band 1 may be of any ordinary type, and is adapted to fit onto either a wooden wheel or a wheel having wire spokes. When it is being rolled, the hemispherical projections 2 are formed on it by making depressions 3 in the inner face; or, if the rim is already made, these depressions may be put in by rolling the rim between cylindrical dies properly formed. The rim 4 is trough-shaped in cross-section, so that it may accommodate a tire 5, which may be of any form, as of the well-known pneumatic type having an inner tube. The rim may either be continuous circumferentially, or it may be divided, as at 6, in order to facilitate the applying and removing of a tire or tire casing. The rim is perforated, so that the valve stem 7 may pass therethrough. On the inner face of the rim, near the opening through which the valve stem passes, there are formed, at the points 8 for example, hemispherical recesses. These recesses are formed by depressing a groove in the outer face of the rim, which groove is in the shape of the circumference of a circle. It will thus be seen that a ridge 9, shown in Fig. 7, is formed on the inner face of the rim at the points 8. This ridge has the form of the circumference of a circle, and within it there is formed the hemispherical recess 10. This recess has the same curvature as the projections 2 and has a depth which will permit it to accommodate the projections 2, so that the ridge 9 will rest upon the band 1 just at the base of the projection 2, and the ridge 9 is formed so that it will snugly fit into the curve formed as the projection 2 merges into the band 1. The ridges 9 are formed on the rim along the center line thereof, and are spaced apart at distances corresponding to the spaces between the projections on the band. At points 11, farther removed from the valve stem than the points 8, there are formed, in the outer face of the rim, depressions in the shape of half the circumference of a circle, which depressions result in the formation of a ridge 12 on the inner face of the rim, as shown in Fig. 6, which ridges have the shape of half the circumference of a circle, and providing within them recesses 14 having the shape of half a hemisphere. These recesses 14 are formed to accommodate certain of the projections 2 on the band, and have the same contour as the projections, just as the recesses 10 have the same contour as the projections 2. The ridges 12 are extended out at their ends at 14' in parallel lines to permit the ridges to guide the projections as they enter the recesses 14.

When the rim is placed upon the band, the valve stem 7 is slid through the opening in the band, so that the first movement in applying the rim to the band is seen to be a substantially radial movement of the rim relatively to the band in the same plane. Therefore, the complete hemispherical recesses 10 will fit over the projections 2 which are near the point where the valve stem passes through the band. Those recesses formed on the inner face of the rim which are farther from the valve stem do not have a radial movement relatively to the band, and, therefore, they cannot be formed so that they will have to be placed over the projections on the band by a radial movement. For this reason, the recesses are formed so that they have an opening in the side, and after the recesses 10 are placed over the projections 2 the part of the wheel diametrically opposite from the valve stem is moved axially relatively to the band and the recesses 14 are slid around the projections 2.

It will be seen at this point that I have described means which will prevent either relative axial or relative circumferential movement of the rim and band in that part of their circumferential extent near the valve stem, and I have provided means in the diametrically opposite part which will prevent relative circumferential movement and relative axial movement in one direction. In order to force the rim and band into the same plane in that part opposite from the valve stem, I have formed certain of the ridges 12, as at 15, with a flat edge 16, substantially parallel to the edge of the rim, as shown in Figs. 2 and 5, and have provided means on the band to coöperate with these to force the recess 14 to fit around its corresponding projection 2. This means mounted on the band consists of a lug 17 fixed to the band, to which is pivoted a link 18 by the pin 19, and on the other end of this link 18 is pivoted the hook 20 by means of the pin 21. This hook 20 extends around the edge of the band and its end 22 is formed to fit the straight edge 16 formed on the ridge 12 with which the hook coöperates. Formed integral with the link 18 is a lever arm 23 for swinging the link 18 about the pin 19. As this link 18 swings toward the rim, it carries the pin 21 with it and when the end 22 coöperates with the face 16 and the pin 21 is swung to a point nearer the surface of the band 1 than the pin 19 a toggle is formed, and any tendency of the rim to slide relatively to the band (to the right in Fig. 2) will tend to force the pin 21 still nearer to the band 1 and still more tightly lock the hook 20 in position. Toggle devices of the kind just described are positioned at certain points on the band opposite the part having the hole through which the valve stem slides, and enough of them are provided to prevent the projections 2 from sliding out of the open sides of the recesses 14.

In order to remove the rim from the band, the levers 23 are moved to release the hooks 20 to the position shown in dotted lines in Fig. 2. The hooks are then swung down away from the rim and the rim moved axially relatively to the band until it is disengaged therefrom, and the rim is then moved radially relatively to the band, so that the valve stem slides out of the opening through which it passes and the projections 2 are withdrawn from the recesses 10.

While I have described and illustrated my device as being used in connection with a flat band, it may be used in connection with other shapes of bands, and might even be mounted on a yoke connected to a felly band and passing over the wooden felly of a wheel of the artillery type.

While I have illustrated and described with great particularity a device in which my invention is embodied, I do not intend that I shall be limited to the specific details described, but intend that my invention shall be limited only by the hereunto appended claims.

What I claim and desire to secure by Letters Patent of the United States is the following:—

1. In combination, a rim and a felly band, said rim and band being formed to interlock upon relative movement, and means comprising an automatically locking toggle for moving said band and rim relatively and automatically locking them in such relatively moved position.

2. In combination, a felly band member and a rim member adapted to fit thereon, a link pivoted to one of said members and a second link pivoted only to said first link and adapted to coöperate with the other member, whereby the rim member is forced into place on said band member.

3. In combination, a felly band member and a rim member adapted to fit thereon, a link pivoted to one of said members and a second link pivoted to said first link and adapted to coöperate with the other member, said links being formed to permit said second pivot to lie nearer to said first member than said first pivot, whereby the rim member is forced into place on said band member and locked thereon.

4. In combination, a rim member, a felly band member, interlocking parts on said members adapted to be brought into interlocked relation upon relative movement of said members in the same plane, additional interlocking parts on said members adapted to be brought into interlocked relation upon relative movement of said members axially, and a locking toggle secured to one of said members for coöperating with the other of said members to move said members relatively axially and lock them in such relatively moved positions.

5. In combination, a rim member and a felly band member, said members being formed to mutually interlock upon relative movement, a link pivoted to one face of one of said members, a second link pivoted to said first link and having one of its ends formed to coöperate with said other member, both said links being formed to permit said second pivot to be closer to said face of said first member than said second pivot whereby said members may be relatively moved when said links rotate relatively about said second pivot and be locked in such moved position.

6. In combination, a rim member, a felly band member, said members being formed to interlock upon relative movement, a link pivoted to the face of one of said members, a second link pivoted thereto, said second link having a projecting portion adapted to coöperate with said other member, said links being so formed that when said portion coöperates with said other member said links at the point of said second pivot rest against said face and said second pivot is nearer said face than said first pivot whereby said members may be relatively moved and locked.

7. In combination, a rim member and a felly band member, one of said members having projections thereon, the other member having a plurality of recesses thereon for the accommodation of said projections, all of said recesses opening radially and certain of said recesses opening also at one side, a link pivoted to the member having projections, a link pivoted to said first-named link and having its end formed to extend around the edge of the member on which the first link is pivoted, said end being adapted to coöperate with the closed side of said last-named recesses.

8. In combination, a rim having depressions in one face in the form of the circumference of a circle, whereby recesses are formed on the opposite face, and a felly band having projections formed thereon and fitting within said recesses.

9. In combination, a rim having depressions in one face throughout part of its circumferential extent in the form of the circumference of a circle whereby recesses are formed in the opposite face and having depressions in the first-named face in the remainder of its circumferential extent which are in the form of half a circumference of a circle whereby open-sided recesses are formed in the opposite face and a band having projections thereon accommodated by said recesses.

10. In combination, a rim member and a felly band member, one of said members having projections thereon, the other of said members having a plurality of recesses thereon for the accommodation of said projections, certain of said recesses opening radially and also at one side, and means mounted on one of said members and coöperating with said other member to move said members relatively to a position wherein said last-named recesses surround and contact with certain of said projections, said means being adapted to become automatically locked upon said members reaching their limiting positions.

11. In combination, a felly band member and a rim member adapted to fit thereon, a stud on one of said members having pins extending from opposite sides thereof, a link having a bifurcated end, the branches of which are respectively pivoted on said pins, a second link having a bifurcated end, the branches of which are pivoted to the free end of the first link, the free end of said second link being formed to coöperate with the other of said members to force said rim member onto said felly band member when said first-named link swings about said pins, and means for causing said first-named link to swing about said pins.

In testimony whereof, I have signed my name to this specification, in the presence of two subscribing witnesses.

LEO KAPPERTZ.

Witnesses:
  MARY L. JAMIESON,
  NORA C. PRUDEN.